United States Patent [19]

Green

[11] 4,297,673
[45] Oct. 27, 1981

[54] OMNIDIRECTIONAL SPEED COCKPIT DISPLAY

[75] Inventor: David L. Green, Potomac, Md.

[73] Assignee: Pacer Systems, Inc., Burlington, Mass.

[21] Appl. No.: 886,485

[22] Filed: Mar. 14, 1978

[51] Int. Cl.³ .................. B64D 45/00; G08G 5/02
[52] U.S. Cl. .................. 340/27 NA; 116/202; 116/DIG. 43
[58] Field of Search ......... 116/284, 202, 290, 289, 116/280, 281, DIG. 43, 299; 73/178 H; 340/27 NA

[56] References Cited

U.S. PATENT DOCUMENTS

| | | | |
|---|---|---|---|
| 2,469,403 | 5/1949 | Parker, Jr. | 116/299 X |
| 2,535,003 | 12/1950 | Wendt | 116/299 X |
| 2,578,177 | 12/1951 | Dehmel | 116/284 X |
| 2,845,623 | 7/1958 | Iddings | 73/178 H |
| 2,892,180 | 6/1959 | Smith | 340/27 NA |
| 3,002,381 | 10/1961 | Castro et al. | 73/178 X |
| 3,048,836 | 8/1962 | Guarino et al. | 340/78 NA X |
| 3,292,176 | 12/1966 | Crane | 340/27 NA X |
| 3,382,351 | 5/1968 | Schweighofer et al. | 340/27 NA X |
| 3,474,406 | 10/1969 | Gilstrap | 116/202 |
| 3,691,987 | 9/1972 | Strock | 73/178 R |
| 3,967,236 | 6/1976 | Dietrich | 73/178 H |
| 4,027,838 | 6/1977 | Barnum et al. | 73/178 H |
| 4,034,605 | 7/1977 | Green | 73/178 H |
| 4,044,709 | 8/1977 | Greene | 73/178 H |

Primary Examiner—Daniel M. Yasich
Attorney, Agent, or Firm—James C. Wray

[57] ABSTRACT

An omnidirectional airspeed indicator has a plate with a window and a fixed horizontal bar across the window. A drum with graduations and numerical indications of speed and forward and rearward direction and with a safe flight envelope indication and safe engagement and disengagement indication rotates within the window so that the horizontal bar points to the forward and rearward speeds. A vertical bar moves between a drum and the window to indicate lateral speeds. Vectoral sum of speed is presented in digits at the top of the window. A rearward flight warning light is mounted beneath the window and a high speed warning flag appears in the window when maximum safe speeds are approached. Triangles at the lateral edges of the window cause the vertical bar to appear as a broken line when maximum lateral indications are approached or exceeded. Rate of climb is indicated by a pointer beside the window. A selector switch lights air density in the digital display. Airspeed inputs or ground speed inputs drive the indicator. A flag or light indicates which mode was in use if both types of data were alternately applied.

28 Claims, 9 Drawing Figures

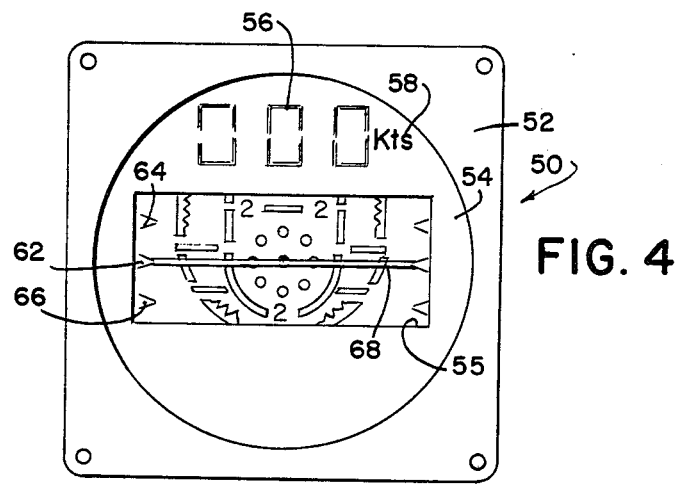
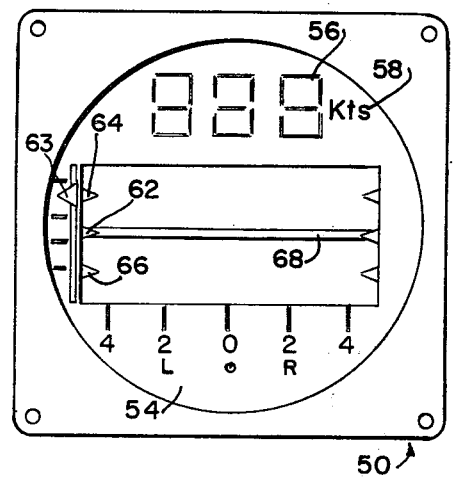
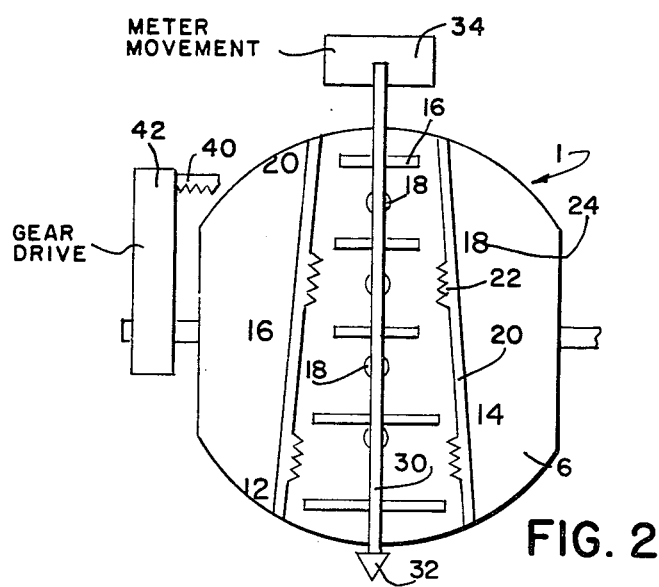
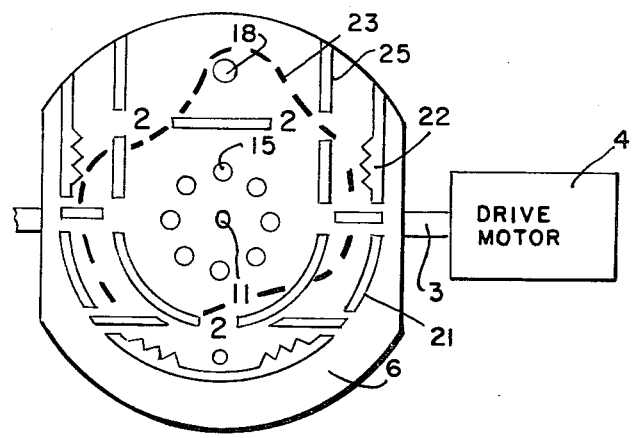

OMNIDIRECTIONAL SPEED COCKPIT DISPLAY

BACKGROUND OF THE INVENTION

Omnidirection speed displays are found in United States Patent and Trademark Office Class 73, Measuring and Testing, subclass 178H and in Class 116, Indicators, subclass 129 and Digest 43. Examples of prior art are found in U.S. Pat. Nos. 2,567,212; 2,845,623; 3,048,836; 3,395,576; 3,355,733; and 4,044,709.

SUMMARY OF THE INVENTION

The omnidirectional airspeed display is an airspeed indicator designed to receive and display omnidirectional airspeed from zero knots to 250+ knots in any direction. The magnitude of the flight path vector is presented on a digital lighted display, located at the top of the indicator face. This portion of the display consists of three filtered, variable voltage, seven segment, incandescent displays providing 0.5 inch digits. This lighted display is capable of reading continuously from 000 to 999, but the normal operating range is 000–250+ for airspeed indications. The longitudinal component of airspeed drives a rotating drum which moves past a fixed horizontal bar. When speed increases in the forward direction, the face moves. When speed becomes more aft, the face moves up. The drum is driven by a phase controlled DC motor torque/potentiometer. Mechanical stops constrain rotation of this drum so as to prevent rotation past an indication of about 220 knots forward and 50 knots rearward.

When the rearward component exceeds about 7 knots, a 28 volt red, filtered incandescent lamp illuminates to warn of rearward flight. This lamp is mounted behind the face plate and located between the "L" and "R" on the sideward airspeed scale at the lower edge of the indicator.

A high speed limit flag tracks with the drum and approaches the fixed horizontal bar as the limit forward airspeed is approached. This limit flag is driven by a high torque microamp meter aircraft mechanism.

A vertical bar moves right for increases in component airspeed to the right, and left for increases to the left. This bar has a useful indication range of about ±45 knots and rests against mechanical limits at about ±50 knots. Three red triangles are mounted on both sides and partially cover the bar when it nears the mechanical limits. The vertical bar is driven by a high torque microamp meter aircraft mechanism.

An "Off" flag provides warning of power loss and other airspeed subsystem failures which may be mechanized to interrupt the fail-show circuit. This flag is driven by a high torque circuit device.

The display is lighted from within the drum and from the front of the display case. The face markings include ten knot incremental speed division, a rotor engagement envelope, and an extended horseshoe, indicating the safe flight envelope.

An omnidirectional cockpit display apparatus of the present invention has a drum and means for supporting and turning the drum and a zero point, and a safe flight envelope marked on the drum, surrounding the zero point.

The safe flight envelope provides the pilot a reference as to the conditions, in regard to lateral and vertical wind speed components within which the aircraft can safely operate. Operation of the aircraft outside the safe flight envelope increases the chance of the aircraft not being able to respond in a normal manner. The pilot will use the safe flight envelope for landing and take-off, hovering and inflight operations. Additionally, there are separate parameters, specifically for safe rotor engagement and disengagement. This envelope is similar but not exactly the same as the safe flight envelope.

The safe flight envelope has portions for indicating rearward and lateral flight relatively slightly spaced from the zero mark and portions for indicating lateral safe flight limits in forward flight directions relatively more spaced from the zero point mark and extending substantially around the drum.

The safe flight envelope mark extends in a direction for indicating rearward and lateral flight generally in a semicircle which is based from the zero point and wherein the safe flight envelope mark continues upward from positions laterally off-spaced from the zero point in generally parallel lines and then tapers inwardly. In one embodiment of the invention parts of the safe flight envelope marks comprise broken lines spaced from the zero point mark on the drum.

The omnidirectional speed cockpit display apparatus safe flight envelope may have jagged edge sections to facilitate seeing the line in one embodiment.

Plural parallel marks extend transverse to a forward and rearward direction and indicate forward speeds.

Numbers marked on the drum adjacent the parallel marks relate value of speed to each mark in tens of units.

Dots interpose medially between the parallel marks for further indicating 10 knot increments of speed and for highlighting the center position or the off-center condition of the lateral bar near zero speed.

A plurality of dots arranged in circles on the ball centered around the zero point highlight the zero point and indicate speeds in directions from the zero point. By providing dots opposed orthonormally, the circle provides a broadened accurate center, which is especially important during reduced lighting.

A U-shaped mark having a semicircle extending in the rearward speed indicating direction and centered on the zero point mark and having parallel legs extending in the forward speed-indicating direction indicates significant twenty knot speed in rearward and lateral directions.

A safe rotor engagement and disengagement envelope is positioned around the zero point mark in varied distances.

A fixed marker adjacent the drum cooperates with the drum to indicate forward and rearward speeds as the drum moves.

A second marker moves transversely to motion of the drum and indicates speed in lateral directions.

A digital display mounted adjacent the drum and markers presents vectoral sum of speed.

A mounting plate has an opening revealing the face on the drum. The horizontal bar extends across the opening to indicate forward and rearward speed.

Zero and numerical indications of speed along one of the upper and lower edges of the opening and a movable bar mounted between the opening and the drum indicate lateral speed.

Triangular portions along lateral edges of the opening visually break the line of the movable bar when the bar moves laterally to an extent that it is behind the triangular portions. The bar appears broken, indicating that lateral limits of the display have been reached or exceeded.

A moveable indicator along one lateral edge indicates vertical speed.

A high speed limit flag movable with the ball to drum appears in front of the drum and presents a warning of reaching speed limits.

Air density is presented on the lighted digits in response to pushing an air density button or turning an air density selector switch.

An indicator light is mounted on the face plate, and means for energizing the indicator light are connected to the mount for illuminating the light to indicate rearward speed.

Broadly, the omnidirectional speed cockpit display apparatus comprises a mounting means, window means connected to the mounting means for presenting indications of speeds, and comprising changeable face means connected to the mount for presenting changeable instrument face indications with changeable safe flight envelopes in the window means, horizontal bar means connected to the mount for presenting fixed horizontal bar indicators in the window means, movable vertical bar means connected to the mount for presenting movable vertical bar indicators in the window means and digital speed indicating means connected to the mount for presenting digital indications of vectoral speed sum in the window means.

The omnidirectional speed cockpit display will indicate the aircraft's vertical speed, lateral speed and the vectoral speed sum. The vectoral speed sum is attained by determining the vectoral sum of the lateral and vertical speed vectors. An external analyzing unit makes the vectoral sum computations.

The invention provides the method of displaying omnidirectional speed comprising presenting a changeable face having speed indications within a window, presenting safe flight envelope indications on the changeable face, changing the face and thereby changing safe flight envelope indications, holding at least one bar means stationary with respect to the changing face and moving at least one other bar means with respect to the changing face thereby presenting in cooperation with the changing face orthogonal indications of speeds.

Broad objectives of the invention may be provided by moving the face and vertical bar electronically such as by using a cathode ray tube.

A flag indicates when airspeed or ground speed inputs are being used.

BRIEF DESCRIPTION OF THE DRAWINGS

FIG. 1 shows a drum and the markings of the present invention.

FIG. 2 shows the drum of FIG. 1 and other moving parts of the omnidirectional speed indicator.

FIG. 3 shows a plate which is mounted over the drum shown in FIG. 2.

FIG. 4 shows the drum position behind the face plate.

FIG. 5 shows a display indicating seven knots in a rearward flight direction.

FIG. 6 shows a speed of 51 knots substantially in the rearward flight direction and beyond the rearward portion of the safe flight envelope.

FIG. 7 shows a condition of slight rearward speed and lateral speed beyond the indicator limits.

FIG. 8 shows a condition of fast forward speed approaching safe flight limits, and FIG. 9 shows a condition of excessive forward speed.

DETAILED DESCRIPTION OF THE DRAWINGS

Figure 5:
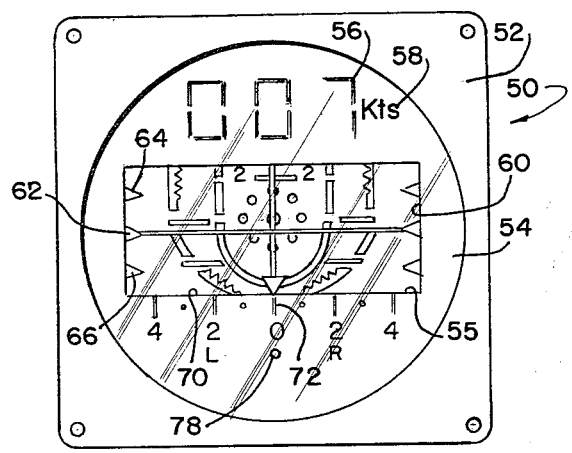
FIGS. 5 through 9 show particular indication of speed on the omnidirectional display.

Referring to FIGS. 1 and 2, a drum is mounted on a shaft mounting means 3 for support and for rotation by instrument drive motor 4, a phase controlled DC motor, which is located within the drum but which is shown schematically beside the drum. Movable face 6 moveable with the drum has a zero point mark 11 and 10 knot indicators represented by a plurality of dots 15 which surround the zero point 11. Dots 15 work in conjunction with the fixed and movable cross bars to indicate the 10 knot speeds and assist vision in picking up the zero point 11 in low light. The 10 knot speed indicators represented by dots 15 reemphasizes the zero point. Horizontal marks 17 as shown in FIG. 2 are graduations showing speeds which are numerically represented on the face of the drum in tens of knots.

In the preferred embodiment as described in the drawing the horizontal bars 17 are spaced at 20 knot intervals, and dots 19 denote ten know intervals between the 20 knot bars. Numerical values such as shown in the ball and pointed out by reference numeral 24 in FIG. 2 are related to the horizontal cross bars and give speed values for the cross bars in multiples of ten knots.

For example, the 2's in FIG. 1 and the 12, 14, 16, 18, and 20 in FIG. 2 represent respectively 20, 120, 140, 160, 180, and 200 knots.

A horseshoe shaped line denotes the significant value of 20 knot rearward and lateral speeds, as shown in FIG. 1.

A safe flight envelope 21 has jagged areas 22 which facilitates seeing the line under dim lighting conditions. The safe light flight envelope may be represented in broken lines as shown in FIG. 1 or solid lines as shown in FIG. 2.

Envelope 22 continues around the drum face 6 and tapers inward as speed increases.

Dashed line 25, indicated 2, represents 20 knot multidirectional speed.

A safe rotor engagement-disengagement envelope 23 is added to face 6 to assist a helicopter pilot in knowing when the rotor may be safely engaged and disengaged.

For example, if a helicopter is sitting on the ground with its rotor disengaged, the wind causes the drum to turn to indicate forward or rearward wind components and causes the vertical indicator 30 to move left or right to reveal lateral wind components. As long as the bars cross within the area surrounded by envelope 23 the rotor may be safely engaged. If the rotors cross outside of the area, the pilot may wait until a wind gusts receeds or may turn the craft so that the bars cross within an area bounded by the safe engagement-disengagement envelope 23. After the helicopter has landed, ambient wind conditions may cause the bars to cross outside of the envelope whereupon the pilot knows it is not safe to disengage the rotor.

A movable vertical bar indicator 30 is schematically shown in FIG. 2. Vertical bar 30 has a pointer 32 at one end and is driven by a high torque microamp meter 34 which receive inputs from an analyzer which converts raw outputs from a sensing device to inputs usable for the meter 34 movement. The inputs through microamp meter 34 drive vertical bar indicator 30 horizontally left or right of a zero point. The microamp meter 34 drives indicator 30 which represents the quartum of the lateral speed component affecting air speed the sensing device may, for example, be a Loras low-range air speed sensing device as applied by Pacer Systems, Inc. of Burlington, Mass. Meter movement 34 and drive motor 4 may be conventional indicator movers.

High speed warning flag 40 is connected through a drive 42 to shaft 3 to the phase controlled DC motor 4 which moves the drum. Drive 42 is geared to the turning of shaft 3, so as the upper forward speed limit is approached and indicated on face 6, the high speed flag 40 will move downward in conjunction with the reaction of drum 1 in view in window 54. As the upper forward speed limit appears in the window, flag 40 starts to move downward and appears in the window indicating the actual limit speed and giving a warning that forward speed limit is being approached.

Figure 8:
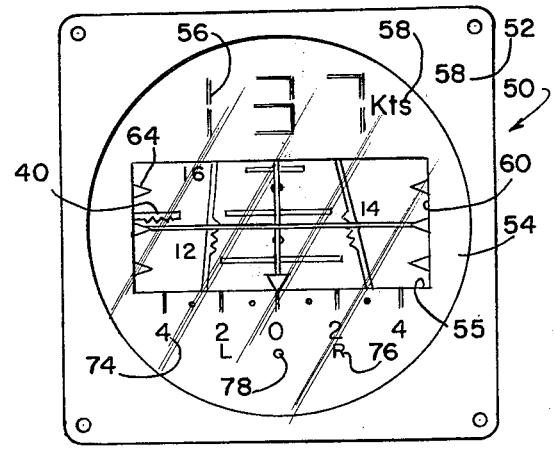

FIG. 3 shows plate 50 which connects to mounts on the front of the apparatus shown in FIG. 2. The disposition of plate 50 on the apparatus of FIG. 2 is shown in FIG. 8.

Flag 40 is connected to a meter movement which is driven by a signal so that it keeps the correct relative position relative to the drum when the limit speed is being approached. If density altitude changes or if gross weight changes (etc.), the correct relative position will also change.

Plate 50 has a central window portion 54 with a window opening 55 through which the drum appears. Conventional seven element digital displays 56 are positioned at the top of the window area 54. The display 56 will provide digital representation of the resultant vectoral speed based on the vectoral sum of the lateral speed and vertical speed vectors. The abbreviation KTS 58 indicates that the display reads in knots.

The plate 50 with window 54 has cross bar 68 which cooperates with face 6 to indicate aircraft speed as drum 1, with face 6 rotates.

A cross bar 68 is permanently mounted in the center of the window and triangles 62, 64, and 66 extend inward from lateral edges of window 55.

A sliding pointer 63 indicates vertical speed on a fixed scale adjacent the pointer.

For example, vertical speed may be sensed by a conventional electro-pneumatic instantaneous vertical speed sensor (IVSI) as produced by Teledyne Avionics of Charlottesville, Va.

The outer edge 52 of plate 50 has conventional mounting holes for mounting on an instrument panel.

FIGS. 5 through 9 show varied indications on the display. In FIG. 5 the drum has been rotated slightly upward so that the horizontal bar is slightly below center as can be seen from the relationship of the bar with the inner circle of dots. Seven knots are indicated on the digital display 56. Vertical bar 30 is aligned with the zero indication on the scale of lateral air speed component 72 located along the lower edge 70 of window 55. Lamp 78 is illuminated, indicating rearward speed. The seven knots indicates seven knots of rearward air speed well within the safe flight envelope.

Figure 6:
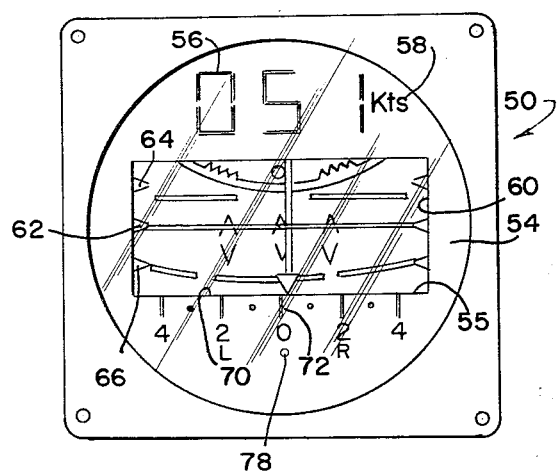

FIG. 6 shows a condition in which the safe flight envelope has been exceeded in rearward air speed. Triangular marks on the drum beneath the horizontal bar indicate the drum has rotated to hard stops and point the direction of recovery. Lamp 78 is lit and the digital indication shows 51 knots. The vertical bar shows an offset of about 2 knots to the right.

Figure 7:
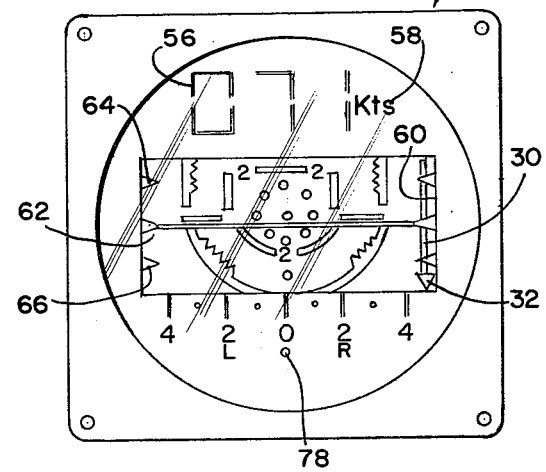

FIG. 7 indicates a dangerous situation in which the safe flight envelope has been exceeded in lateral air speed. Bar 30 has moved to the right behind warning triangles at lateral edge 60.

The digital indicator shows vector sum of 71 knots air speed and the rotational position of the drum shows a slight rearward component of about 5 knots.

As can be seen at the right of the drawing, the triangles along edge 60 break up the line of bar 30, highlighting the dangerous condition and showing direction of recovery.

In FIG. 8 the indicator shows an approach to a speed of 140 knots in the forward direction and high speed flag 40 has moved downward into position to indicate the approach of the high speed limit of about 138 knots.

Figure 9:
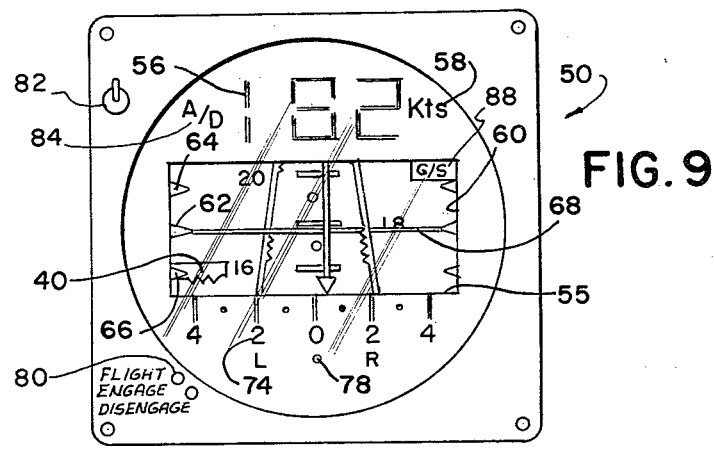

FIG. 9 shows an exceedingly high speed limit condition when flag 40 has moved downward near triangle 66. The digital display indicates 182 knots vectoral air speed sum, while the vertical bar indicates a 4 knot lateral air speed component, and the fixed horizontal bar 68 indicates a forward component of approximately 177 knots.

In a further form of the invention the moving face is presented electronically by cathode ray tube and the moving vertical bar and flag 40 and pointer 63 are also produced electronically and the cathode ray tube. Selector buttons 80 associated with the CRT display selectively illuminate either the safe flight envelope or the safe engagement-disengagement envelope 23 in FIG. 1. In the CRT display, only portion of the envelope may appear and only when said limits are approached.

In a preferred form of the invention lamp 78 is a bright red light. Scale 72 and numbers 74 and warning flag 40 and cross bar 68 are illuminated from their side edges. The drum has an internal light of variable intensity to illuminate the translucent markings on the face 6 of the drum.

In a preferred form of the invention, the drum markings are of different translucent colors.

Digital display 56 comprised seven-element conventional lighted digits or rolling wheels or belts with members rolling into view.

A button or selector switch means 82 located on the instrument face selects air density indicator on the three digits. At the same time letters "A/D" 84 or "air density" may be rear lighted at the left of the digits. Concurrently a lamp behind the "Kts" notation 58 is extinguished. A solenoid-retained "OFF" flag 86 drops into the window to indicate loss of power. A "G/S" or "ground speed" flag 88 appears in the window to indicate that the system is using ground speed inputs.

While the invention has been described with reference to the specific embodiments, it will be obvious to those skilled in the art that variations and modifications of the invention may be constructed without departing from the scope of the invention. The scope of the invention is defined in the following claims.

I claim:

1. Omnidirectional speed cockpit display apparatus for helicopters and the like comprising a drum having markings of lateral speed and forward and rearward speed having shaft means connected to drive means for supporting and turning the drum, a first zero point mark on the drum, and a safe flight envelope marked on the drum, and at least partially surrounding said first zero point; a face plate with a second zero point mark, for indicating forward and rearward speed with the drum a lateral flight indicator means moving left or right of said second zero point as a means cooperating with lateral speed markings and the safe flight envelope for indicating lateral speed and safety of lateral speed.

2. The omnidirectional cockpit display apparatus of claim 1 wherein the safe flight envelope comprises an elongated envelope having portions for indicating rearward and lateral flight relatively slightly spaced from the first zero mark and having portions for indicating lateral safe flight limits in forward flight directions relatively more spaced from the first zero point and extending substantially around the drum.

3. The omnidirectional speed cockpit display apparatus of claim 2 wherein the safe flight envelope extends in a direction for indicating rearward and lateral flight generally in a semicircle which is spaced from the first zero point and wherein the safe flight envelope continues upward from positions laterally off-spaced from the first zero point in generally parallel lines and then tapers inwardly.

4. The omnidirectional speed cockpit display apparatus of claim 1 wherein the safe flight envelope comprises broken lines spaced from the first zero point on the drum.

5. The omnidirectional speed cockpit display apparatus of claim 1 wherein the safe flight envelope comprises lines having jagged edges spaced from the first zero point.

6. The omnidirectional speed cockpit display apparatus of claim 1 further comprising plural parallel speed indicators extending transverse to a forward and rearward direction and positioned on the drum for indicating forward speeds.

7. The omnidirectional speed cockpit display apparatus of claim 6 further comprising numbers on the drum adjacent the parallel speed indicator for relating value of speed to each speed indicator in tens of units.

8. The omnidirectional speed cockpit display apparatus of claim 6 further comprising subdivisions interposed medially between the parallel speed indicators for further indicating speeds.

9. The omnidirectional speed cockpit display apparatus of claim 1 further comprising a plurality of speed indicators arranged in a circle on the drum centered around the first zero point mark for highlighting the first zero point and for indicating speeds in directions from the first zero point.

10. The omnidirectinal speed cockpit display apparatus of claim 1 further comprising a U-shaped speed indicators having a semicircle extending in the rearward speed indicating direction and centered on the first zero point and having parallel legs extending in the forward speed indicating direction for indicating speeds in rearward and lateral directions near the first zero point.

11. The omnidirectional speed cockpit display apparatus of claim 1 further comprising a safe rotor engagement and disengagement second envelope on the drum and surrounding the first zero point.

12. The omnidirectional speed cockpit display apparatus of claim 11 wherein the safe rotor engagement and disengagement envelope is positioned around the zero point in varied distances.

13. The omnidirectional speed cockpit display apparatus of claim 1 further comprising a fixed marker adjacent the drum in the faceplate for cooperating with the drum to indicate speeds as the drum moves.

14. The omnidirectional speed cockpit display apparatus of claim 1 the lateral flight indicator means comprising a movable marker and means to mount the movable marker adjacent the drum and means to move the movable marker transversely to motion of the drum.

15. The omnidirectional speed cockpit display apparatus of claim 1 the face plate further comprising a mounting plate having an opening revealing a portion of the drum, and a fixed horizontal bar extending across the opening for cooperating with the drum to present indications of forward and rearward speed.

16. The omnidirectional speed cockpit display apparatus of claim 15 further comprising zero and numerical indications of speed along one of the upper and lower edges of the opening and the lateral indicator means comprising a vertically oriented movable bar mounted between the opening and the drum for indicating with respect to the numerical indications and the drum lateral speed.

17. The omnidirectional speed cockpit display of claim 15 further comprising digital display means on the plate adjacent the opening for indicating vectoral sum of speeds.

18. The omnidirectional speed cockpit display of claim 15 further comprising a movable indicator along one lateral edge of the opening for indicating vertical speed.

19. The omnidirectional speed cockpit display apparatus of claim 1 further comprising a high speed limit flag connected to the drum and relatively movable for appearing in front of the drum and thereby presenting an indication of high speed limit.

20. Omnidirectional speed cockpit display apparatus for helicopters and the like comprising a mount, window means connected to the mount for presenting indications of speeds, and comprising changeable face means having indications of lateral speed and forward and rearward speed and safe flight envelope indications connected to the mount for presenting changeable instrument face lateral speed and forward and rearward speed indications with changeable safe flight envelopes in the window means, horizontal bar means connected to the mount for presenting with a fixed horizontal bar and the changeable face indications of forward and rearward speed in the window means, movable vertical bar means connected to the mount for presenting with the movable vertical bar means and the changeable face indications of lateral speed and relation to safe flight envelopes in the window means, and digital speed indicating means connected to the mount for presenting digital indications of vectoral speed sum in the window means.

21. Omnidirectional speed cockpit display apparatus for helicopters and the like comprising a mount having a face plate, a central opening in the face plate, fixed horizontal bar means connected to the face plate and extending across the opening, with a face having markings of lateral speed and forward and rearward speed and a safe flight envelope marked on the face on a rotatable drum mounted behind the face plate and appearing through the opening for presenting by the fixed bar means indications of forward or rearward speed, a lateral flight indicator means moving left or right of a zero point for indicating safety of flight and for indicating lateral speed.

22. The omnidirectional speed cockpit display apparatus for helicopters and the like of claim 21 the lateral flight indicator means further comprising a bar moving means connected to the mount and positioned behind the face plate and a movable vertical bar connected to the bar moving means and positioned within the opening whereby the movable vertical bar is presented within the opening and cooperates respectively with marks along the opening and with the movable face mounted behind the opening for presenting indications of speed in lateral directions and for presenting indications of lateral flight safety.

23. The omnidirectional speed cockpit display apparatus of claim 21 further comprising digital display means connected to the mount and mounted behind the face plate and wherein the face plate has a window for presenting digital displays and where the window is positioned adjacent the opening, and digital display means mounted rearward of the window for presenting vectoral sum of speeds.

24. The omnidirectional speed cockpit display means apparatus of claim 23 further comprising switch means connected to the digital display means and air density means connected to the switch means for connecting the air density means to the digital display means upon activation of the switch means whereby air density is displayed in the digital display means.

25. The omnidirectional speed cockpit display of claim 24 further comprising an indicator light mounted on the face plate and means for energizing the indicator light connected to the mount for presenting by illumination of the light an indication of rearward speed.

26. The omnidirectional speed cockpit display apparatus of claim 21 further comprising an "OFF" flag means connected to the face plate and means to drive the "OFF" flag means for driving the "OFF" flag into visibility in the opening when power to the display apparatus is off.

27. The omnidirectional speed cockpit display apparatus of claim 21 further comprising air/ground speed flag means mounted adjacent the plate and drive means connected to the air/ground speed flag means for driving the flag into visibility.

28. The omnidirectional speed cockpit display apparatus of claim 21 further comprising a slot on the plate where a vertical speed indicator means is mounted adjacent the slot and means connected to the plate and to said vertical speed indicator means for driving said vertical speed indicator means to indicate vertical speed.

* * * * *